E. F. KENNEDY.
Coffee-Pot.

No. 164,182.

Patented June 8, 1875.

WITNESSES:
Henry Robinson
Daniel W. McLane.

INVENTOR:
Ebenezer F. Kennedy

THE GRAPHIC CO.PHOTO-LITH.39 & 41 PARK PLACE,N.Y.

UNITED STATES PATENT OFFICE.

EBENEZER F. KENNEDY, OF OIL CITY, PENNSYLVANIA.

IMPROVEMENT IN COFFEE-POTS.

Specification forming part of Letters Patent No. 164,182, dated June 8, 1875; application filed January 14, 1875.

*To all whom it may concern:*

Figure 1:
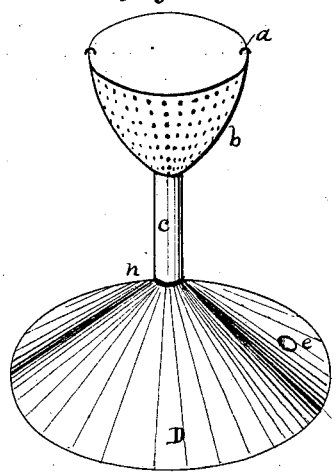
Figure 2:
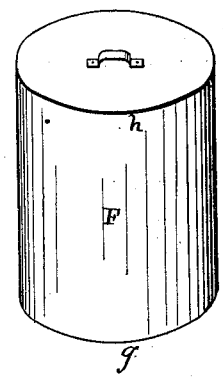
Figure 3:
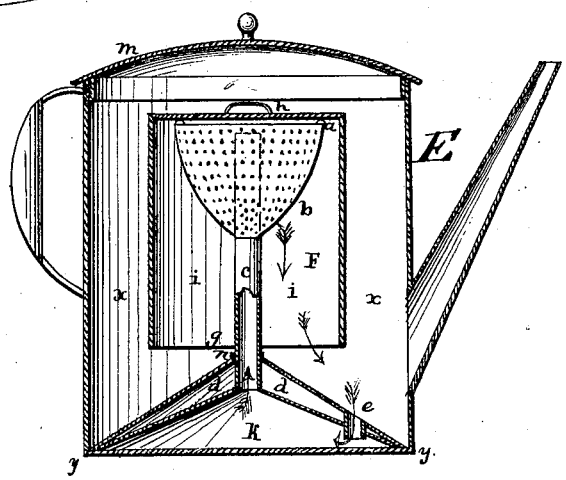

Be it known that I, EBENEZER FINLY KENNEDY, of the city of Oil City, State of Pennsylvania, have invented an Improved Coffee-Boiler, of which the following is a specification:

Figures 1 and 2 are detail perspective views of the parts of my coffee-pot, and Fig. 3 is a vertical sectional view of the same.

This invention has relation to improvements in coffee-pots; and the nature of the invention consists in the arrangement and novel construction, in connection with a filter-cup and a detached ebullition-chamber communicating therewith, of a cold-air chamber interposed between the water in the body of the coffee-pot and that in the ebullition-chamber, whereby the contents of the latter will be heated to a boiling-point before those of the former are at all affected, and will be forced along with steam up into the filter-cup through the coffee in the same, the steam being condensed by the colder water in the vessel above, thus preventing the loss of aroma, and extracting the entire strength of the coffee before any loss is incurred through the escape of steam consequent upon all the water in the pot attaining the boiling-point, as will be hereinafter more fully explained and claimed.

In the annexed drawings, $b$ designates a conical or conoidal cup of any suitable reticulated material, which communicates, by means of a conduit, $c$, with an inverted and preferably conical cup, D. This cup is double-walled for the purpose of forming a chamber, $d$, for air, and conduit $c$ passes through both walls of this chamber, forming an air-tight joint therewith, for a purpose hereinafter explained. $d$ designates a short section of pipe, which also passes through the upper and lower walls of chamber $d$, forming an air-tight joint therewith, by means of which the water in the upper part $x$ of an ordinary coffee-pot has communication with that in an ebullition-chamber, K, formed by cup D and the bottom of the said pot.

My improved coffee-pot operates as follows: The device above described, consisting of cup $b$, conduit $c$, and cup D, with cold-air chamber $d$, is placed in an ordinary coffee-pot, E, with cup D resting over its bottom, completely and snugly covering the same, and the prepared coffee placed in reticulated cup $b$. Water in sufficient quantity, either cold or warm, but not hot, is then poured into pot E. A cylindrical open-ended cup, F, is then passed over cup $b$, with its open end downward, and its close end resting upon the rim of the filter-cup $b$. The lid $m$ having been placed upon the pot, the latter will be placed upon the fire. There being but little water in chamber K, and it being protected from the refrigerating effects of the body of water in the pot by cold-air chamber $d$, ebullition will immediately ensue, when the water and steam will be forced up conduit $c$, into and through the coffee in filter-cup $b$, passing through which it will be directed downwardly by inverted cup F, within which it will be condensed.

As the water in ebullition-chamber K is forced up conduit $c$, it will be replaced by a fresh supply flowing through the pipe $e$ from the body of the pipe.

By this means a constant circulation of the water in the pot is produced, and as each current of ascending hot water and steam is discharged from cup $b$ into cup F it will be condensed by the colder water above, and will thus be prevented from losing any of its aroma or strength through the escape of steam through the joint of lid $m$ and pot E.

By the time that the entire contents of the said pot have reached the boiling-point, when first steam will begin to escape from the pot, the entire strength of the coffee in cup $b$ will have been extracted, and the decoction be ready for use.

Chamber $d$, which is entirely free of water, prevents the heat of the water in ebullition-chamber K from being communicated to the water in the body of the pot, which latter is thus maintained at a lower temperature than the former, and is thus made to condense steam or vapor containing the aroma of the coffee in cup $b$, which is discharged into condenser-cup F.

Having described my invention, what I claim as new, and desire to secure by Letters Patent, is—

1. The double-walled inverted cup D, reticulated cup b, and their connecting-conduit c, combined and arranged substantially as specified.

2. The combination of a condensing-cup, F, with a filtering-cup, b, tube c, passing through air-chamber d, ebullition-chamber K, and pipe e, substantially as specified.

EBENEZER F. KENNEDY.

Witnesses:
HENRY ROBINSON,
DANIEL W. McLANE.